US 7,664,288 B2

(12) United States Patent
Pun et al.

(10) Patent No.: US 7,664,288 B2
(45) Date of Patent: Feb. 16, 2010

(54) DIGITAL WATERMARKING METHOD ROBUST AGAINST LOCAL AND GLOBAL GEOMETRIC DISTORTIONS AND PROJECTIVE TRANSFORMS

(75) Inventors: Thierry Pun, Chêne-Bougeries (CH); Slava Voloshynovskiy, Geneva (CH); Frédéric Deguillaume, Geneva (CH)

(73) Assignee: Universite de Geneve, Geneva (CH)

( * ) Notice: Subject to any disclaimer, the term of this patent is extended or adjusted under 35 U.S.C. 154(b) by 667 days.

(21) Appl. No.: 10/491,681

(22) PCT Filed: Oct. 2, 2002

(86) PCT No.: PCT/IB02/04054

§ 371 (c)(1),
(2), (4) Date: Sep. 8, 2004

(87) PCT Pub. No.: WO03/032254

PCT Pub. Date: Apr. 17, 2003

(65) Prior Publication Data

US 2005/0018871 A1 Jan. 27, 2005

Related U.S. Application Data

(60) Provisional application No. 60/327,097, filed on Oct. 4, 2001.

(51) Int. Cl.
*G06K 9/00* (2006.01)
(52) U.S. Cl. ............... 382/100; 382/232; 382/240; 380/287; 380/51; 380/54; 380/210; 380/252; 348/461; 348/463; 705/57; 705/58

(58) Field of Classification Search ............ 382/100, 382/102, 232, 240; 380/210, 252, 287, 54, 380/51; 713/176, 179; 370/522–529; 348/461, 348/462; 725/9, 20, 22; 704/200.1, 273; 283/72, 74–81, 85, 93, 113, 901, 902; 375/130; 386/94; 705/57, 58

See application file for complete search history.

(56) References Cited

U.S. PATENT DOCUMENTS 5,636,292 A * 6/1997 Rhoads ................. 382/232

(Continued)

FOREIGN PATENT DOCUMENTS

WO WO 00/63647 10/2000

(Continued)

OTHER PUBLICATIONS

Kundur et al (Attack Characterization for effective watermarking.*

(Continued)

*Primary Examiner*—Wesley Tucker
*Assistant Examiner*—Nancy Bitar
(74) *Attorney, Agent, or Firm*—Frommer Lawrence & Haug LLP; Ronald R. Santucci

(57) ABSTRACT

A method of digital watermarking which can resist against local geometrical distortions such as random bending attack, global geometrical distortions as well as projective transforms, but does not necessary require the recovering of global affine transform or even the repetition of the same watermark pattern. Further, the watermark can resist common global affine transformations such as rotation, scaling, and changes of aspect ratio, cropping as well as other types of operations such as filtering, lossy compression, printing/scanning or detection of watermark in front of video, web or photo camera or any imaging device.

16 Claims, 4 Drawing Sheets

Original Image  Image After RBA  Image After Projective Transform  Image After Local Warping

U.S. PATENT DOCUMENTS

| | | | | |
|---|---|---|---|---|
| 5,862,260 | A * | 1/1999 | Rhoads | 382/232 |
| 6,282,299 | B1 * | 8/2001 | Tewfik et al. | 382/100 |
| 6,385,329 | B1 * | 5/2002 | Sharma et al. | 382/100 |
| 6,408,082 | B1 * | 6/2002 | Rhoads et al. | 382/100 |
| 6,483,927 | B2 * | 11/2002 | Brunk et al. | 382/100 |
| 6,580,809 | B2 * | 6/2003 | Stach et al. | 382/100 |
| 6,718,047 | B2 * | 4/2004 | Rhoads | 382/100 |
| 6,904,151 | B2 * | 6/2005 | Deguillaume et al. | 382/100 |
| 7,024,018 | B2 * | 4/2006 | Petrovic | 382/100 |
| 7,113,615 | B2 * | 9/2006 | Rhoads et al. | 382/100 |
| 7,251,256 | B1 * | 7/2007 | Barry et al. | 370/503 |

FOREIGN PATENT DOCUMENTS

WO     WO 02/13138     2/2002

OTHER PUBLICATIONS

Automatic recovery of invisible image watermarks from geometrically distorted images Gordon W. Braudaway, Fred Mintzer.*

Voloshynovskiy, S. et al.: "Multibit digital watermarking robust against local nonlinear geometrical distortions" Proceedings 2001 International Conference on Image Processing ICIP 2001. Thessaloniki, Greece, Oct. 7-10, 2001, *International Conference on Image Processing*, New York, NY: IEEE, US, vol. 3 of 3, Conf. 8, Oct. 7, 2001, pp. 999-1002.

Kundur D. et al.: "Attack characterization for effective watermarking" Image Processing, 1999. ICIP 99. Proceedings. 1999 International Conference on Kobe, Japan Oct. 24-28, 1999. Piscataway, NJ, USA, IEEE, US, Oct. 24, 1999, pp. 240-244.

Tirkel A.Z. et al.: "Image and watermark registration" *Signal Processing. European Journal Devoted to the Methods and Applications of Signal Processing*, Elsevier Science Publishers B.V. Amsterdam, NL, vol. 66. No. 3, May 28, 1998, pp. 373-383.

* cited by examiner

US 7,664,288 B2

DIGITAL WATERMARKING METHOD ROBUST AGAINST LOCAL AND GLOBAL GEOMETRIC DISTORTIONS AND PROJECTIVE TRANSFORMS

This application is a 371 of PCT/IB02/04054 filed on Oct. 2, 2002, published on Apr. 17, 2003 under publication number WO 03/032254 A1 which claims priority benefits from U.S. Provisional Patent Application Ser. No. 60/327,097 filed Oct. 4, 2001.

BACKGROUND OF THE INVENTION

The present invention relates to methods of generating and decoding watermarks robust against local and global geometric distortions (such as random bending and affine transforms) and projective transforms whose main use is copyright protection of digital media such as images, video and digital cinema.

The increasing demands of digital copyright protection market require adequate technologies able to resist against many unintentional and intentional attacks. The digital watermarking, as a means of detection and tracing of copyright violations, is the most attractive scenario accepted by many researchers and companies.

One problem with almost all current watermarking technologies is that they fail to recover a watermark from random bending geometrical distortions, known as the random bending attack (RBA). The RBA was first introduced by F. Petitcolas et al in the benchmarking tool Stirmark to model printing/scanning artifacts (F. A. P. Petitcolas, R. J. Anderson, M. G. Kuhn. Attacks on copyright marking systems, in David Aucsmith (Ed), Information Hiding, Second International Workshop, IH'98, Portland, Oreg., U.S.A., Apr. 15-17, 1998, Proceedings, LNCS 1525, Springer-Verlag, ISBN 3-540-65386-4, pp. 219-239, the content of which is incorporated herein by reference thereto). Although today's watermarking technologies are resistant against printing/scanning, unfortunately the RBA attack still remains an essential problem for almost all existing watermarking methods. The practical danger of this attack is the fact that the attacker can apply it against some watermarking technologies using the Stirmark benchmarking tool, while preserving visual image quality. Having removed the watermark, the attacker can commercially exploit the attacked image, therefore violating copyright laws.

For further background information, see M. Barni, F. Bartolini, V. Cappellini and A. Piva, "Metodo e sistema di marchiatura o cosiddetto watermarking di immagini digitali" ("A method and a system for digital image watermarking"), Italian Patent FI99A000090, filed April 1999, and M. Barni, F. Bartolini, V. Cappellini, A. De Rosa and A. Piva, "Metodo di rivelazione di un marchio in immagini digitalis" ("A method for detecting watermarks in digital images"), Italian Patent FI99A000091, filed April 1999, the contents of which is incorporated herein by reference thereto.

The main difficulty in dealing with the RBA comes from the basic assumption that all geometrical alterations introduced by the attacker are modeled as a global affine transform. This does not hold for the RBA where the introduced distortions cannot be described using only the parameters of a global affine transform. Moreover, the situation is complicated by the fact that many technologies (S. Pereira and T. Pun, "Fast Robust Template Matching for Affine Resistant Watermarks", Lecture Notes in Computer Science: *Third International Workshop on Information Hiding*, Springer, vol. 1768, pp. 199-210, 1999, Italian Patent FI99A000090, filed April, 1999, Italian Patent FI99A000091, filed April 1999, Patent WO 96/36163 PCT/US96/06618, November 1996, the contents of which are incorporated herein by reference thereto) are using a global template in the magnitude spectrum of the image, which does not allow the differentiation of local alterations introduced in the case of RBA.

Several methods use the assumption about the local character of the RBA (P. Bas, J. M. Chassery and B. Maco, "Robust watermarking based on the warping of predefined regular triangular patterns", Proceedings of SPIE: *Security and Watermarking of Multimedia Content II*, San Jose, Calif., U.S.A., January 2000, the content of which is incorporated herein by reference thereto). However, an exhaustive search is used to recover from this attack. Moreover, no dedicated synchronization structure for the estimation of local distortions is proposed in the above methods, except for exhaustive search solutions. This severely hampers the usage of such methods in commercial and on-line applications due to the high computational complexity of the exhaustive approach. One way to overcome this problem is to divide the image into segments or cells, and to embed the watermark into each segment. This has been done by Rhoads (Patent WO 96/36163 PCT/US96/06618, November 1996), by Lin et al (96/36163 PCT/US96/06618, November 1996 (see C. Lin, M. Wu, J. A. Bloom, I. J. Cox, M. L. Miller, Y. M. Lui, "Rotation, Scale, and Translation Resilient Public Watermarking for Images", Proceedings of SPIE: *Security and Watermarking of Multimedia Contents II*, vol. 3971, pp. 90-98, San Jose, Calif., U.S.A., January 2000) as well as by Voloshynovskiy et al (S. Voloshynovskiy, F. Deguillaume and T. Pun, 2000), the contents of which are incorporated herein by reference hereto. A particular example of the use of this approach to watermark generation is the periodical tiling of the same watermark. In fact the idea of repeating the same watermark has several advantages. First, it provides resistance against cropping. Secondly, by exploiting the periodical structure of the watermark, one can use either the autocorrelation function (ACF) (M. Kutter, "Watermarking resistant to translation, rotation and scaling", SPIE International Symposium on Voice, Video, and Data Communication, November 1998) or the magnitude spectrum of the Fourier transform (S. Voloshynovskiy, F. Deguillaume and T. Pun, 2000) to estimate and recover from global transformations. Unfortunately, all these schemes have a significant disadvantage that local random bending alterations and the general class of projective transformations are not integrated in the watermark detector.

The main concept of repetitive watermarking algorithms is based on the fact that if some geometrical transform is applied to the image, each pixel of the image is treated as having the same distortions as the remaining pixels over the whole image. However, the global ACF function or magnitude spectrum are not able to estimate the parameters of RBA. Moreover, there exist two additional typical attacks that are not covered by the global affine model of geometric transforms, namely the general class of projective transforms and local warpings. FIG. 1 illustrates typical local non-linear and global attacks that cannot be described using affine transform.

Therefore, what is needed is a method of Digital Watermarking that does not rely on the global affine model of geometrical transforms and thus protects against local and global Geometrical Distortions and Projective Transforms.

SUMMARY OF THE INVENTION

A new method of digital watermarking is provided which is resistant to local random bending attacks and global geometrical attacks as well as projective transforms, yet which requires neither the use of the global affine transform, nor the repetition of the same watermark pattern. The method is not just resistant to random bending attacks but permits watermark design so as to be resistant to common global affine transformations such as rotation, scaling, and changes of aspect ratio, cropping as well as other types of operations such as filtering, lossy compression, printing/scanning or the recording of image by video, web or photo cameras or any imaging device.

In an advantage of the invention, a method is provided which is able to estimate and recover from local and global non-linear geometrical alterations, which include the RBA and the projective transforms, in images or video.

In another advantage, a reference watermark is used to recover local geometric transformation which is also encoded and, further, can be used for verification of the reliability of the local geometrical transform recovery or fast detection of the watermark in the given data for the particular key.

In another advantage, a locally periodic informative watermark is used for the estimation and recovery from random bending attacks, local nonlinear and projective transforms based on a local autocorrelation function or magnitude spectrum of a given small local region. The periodicity of the watermark can be extended on a global level for the estimation of global affine distortions.

In another advantage, a locally flipped informative watermark can be additionally used for estimation and compensation for translation and cropping attacks, based on the zero-phase condition.

DETAILED DESCRIPTION OF THE PREFERRED EMBODIMENT

Figure 1:
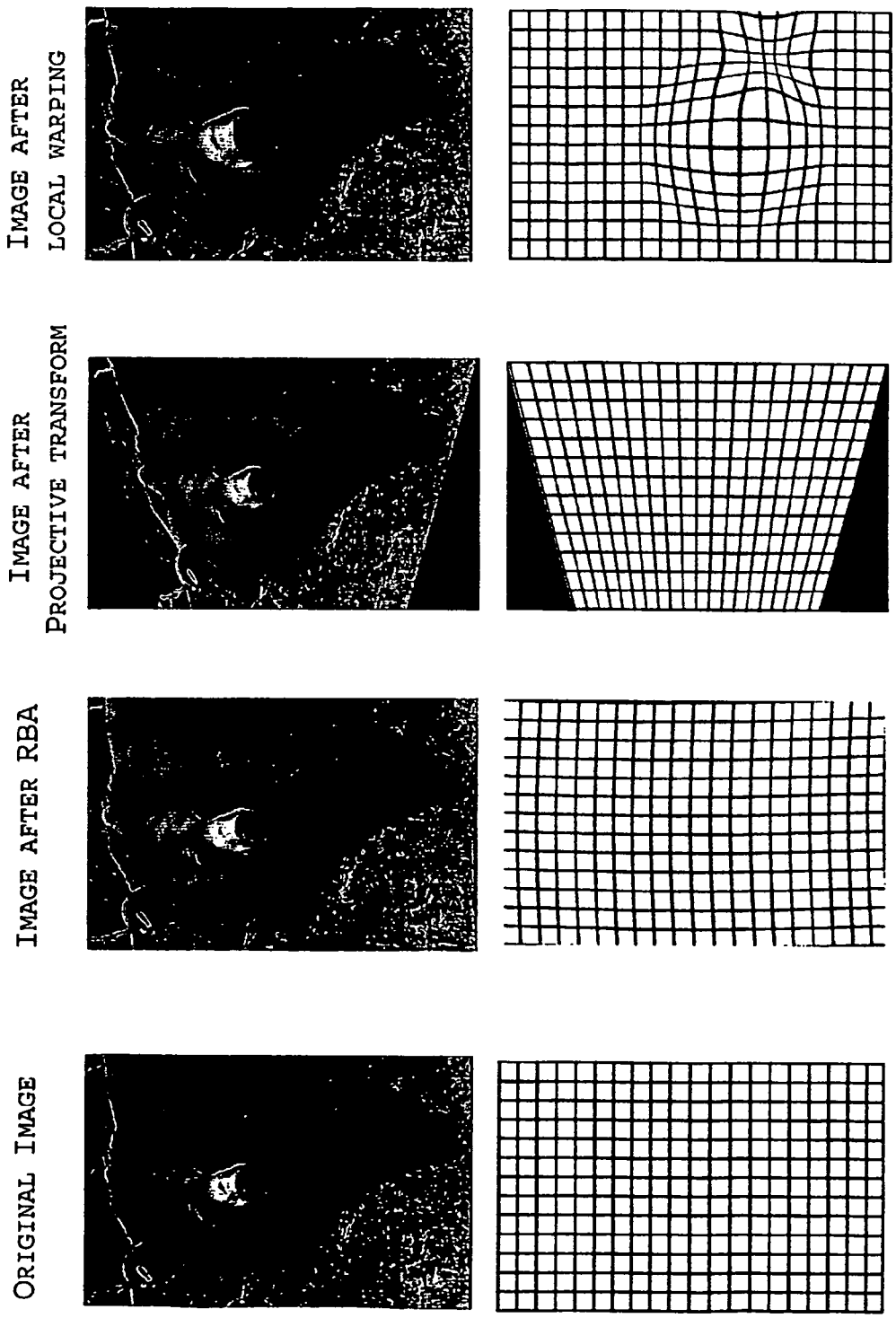
FIG. 1 is a schematic diagram showing typical non-linear geometrical attacks that cannot be described using global affine transform.

Referring now to FIG. 1, typical non-linear geometrical attacks are shown that cannot be described using the global affine transform, namely, the RBA, the projective transforms and local warping. The method of Digital Watermarking of the invention does not rely on the global affine model of geometrical transforms and thus is able to resolve many such attacks.

To better understand the disclosure, certain terms will be defined. The term "informative watermark" refers herein to the watermark which carries the message, and "reference watermark" refers to the watermark which carries additional information about synchronization, reliability and detection (i.e. watermark presence/absence), thus enhancing the determination of the decoding reliability based on the informative watermark only.

The approach of the method considers the geometrical transforms at the local hierarchical level instead of modeling them as global affine transforms. This allows the approximation of a global projective transform as a juxtaposition of local affine transforms which applies to RBA as well. In the case of global affine transforms, the parameters of local affine transforms will be the same as the global one, this allowing the use of the same unified approach for modeling all the above kinds of attacks.

The problem is formulated in the context of image watermarking, but a discussion will follow of how the algorithm can be adapted to video signals as well.

Figure 2:
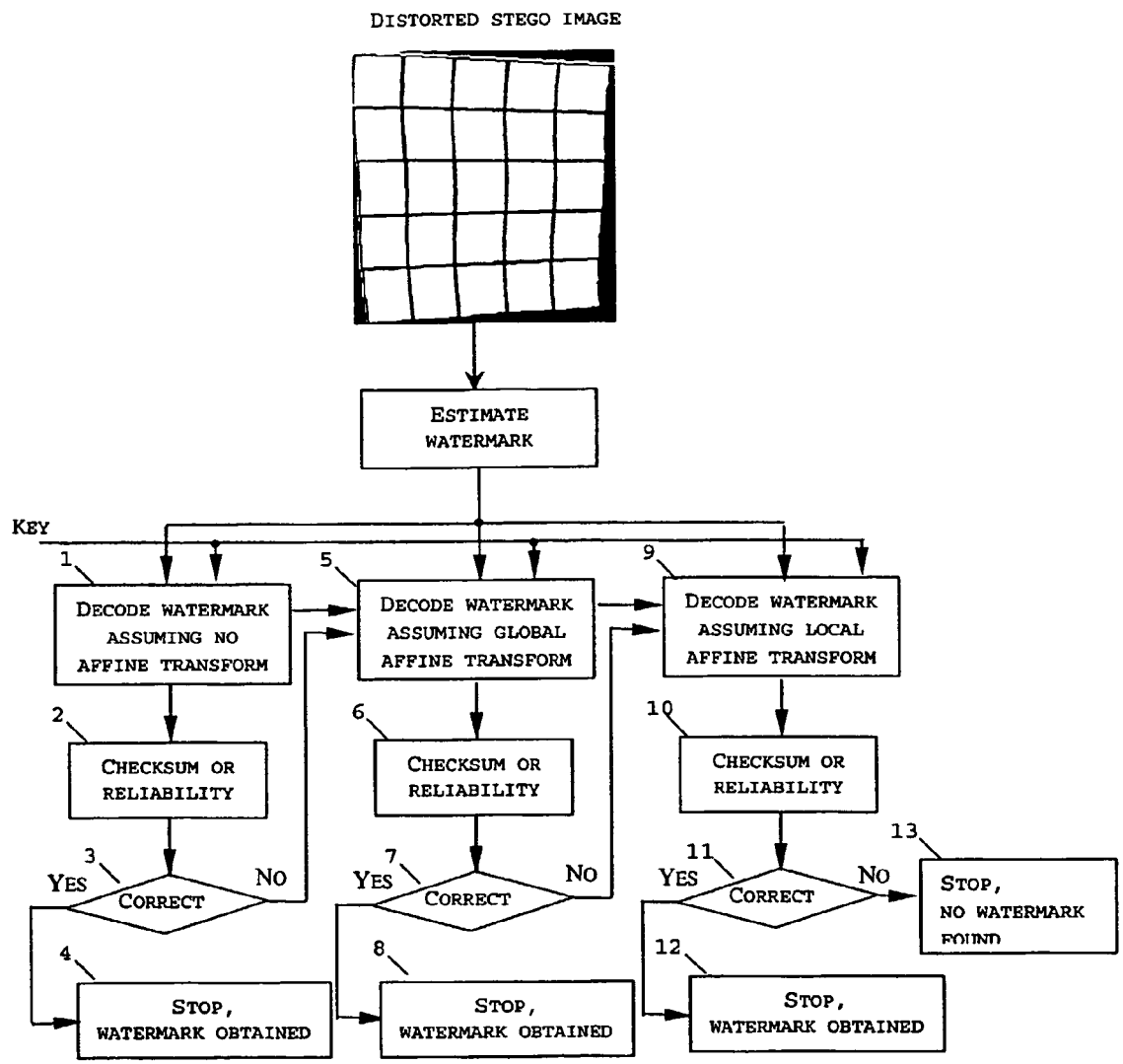
FIG. 2 is a schematic diagram showing an embodiment using the hierarchical algorithm of the invention.

Referring now to FIG. 2, an embodiment for the hierarchical algorithm is shown. Diagram blocks 1 to 4 represent the hierarchical sequence of operations that decode the watermark assuming no geometrical distortions. Blocks 5 to 8 involve watermark extraction assuming global affine geometrical transforms are applied to the image. Blocks 9 to 12 show steps for watermark extraction at the local level, assuming non-linear distortions or RBA.

The algorithm of the invention uniquely applies two components: a specially designed method for recovering from local geometrical transforms, and a reference watermark.

The method for recovering from local geometrical transforms is an approach which is based on the assumption that global affine or projective transforms, as well as the RBA, can be considered as a set of local affine transforms. This approximation is possible due to the restricted amount of invisible distortions that can be introduced by random bending to keep the quality of commercial images within acceptable ranges. Keeping in mind the high level of local correlation required in images, there is a limit to the tolerable amount of distortion. This assumption helps in designing a special type of watermark, encoded with some error correction code (ECC) for robustness, and a dedicated procedure for the estimation and compensation of these geometrical distortions. In particular, we describe here two methods for constructing a local watermark based on the locally periodical and flipped watermark itself, or on a specially designed reference watermark.

Figure 3:
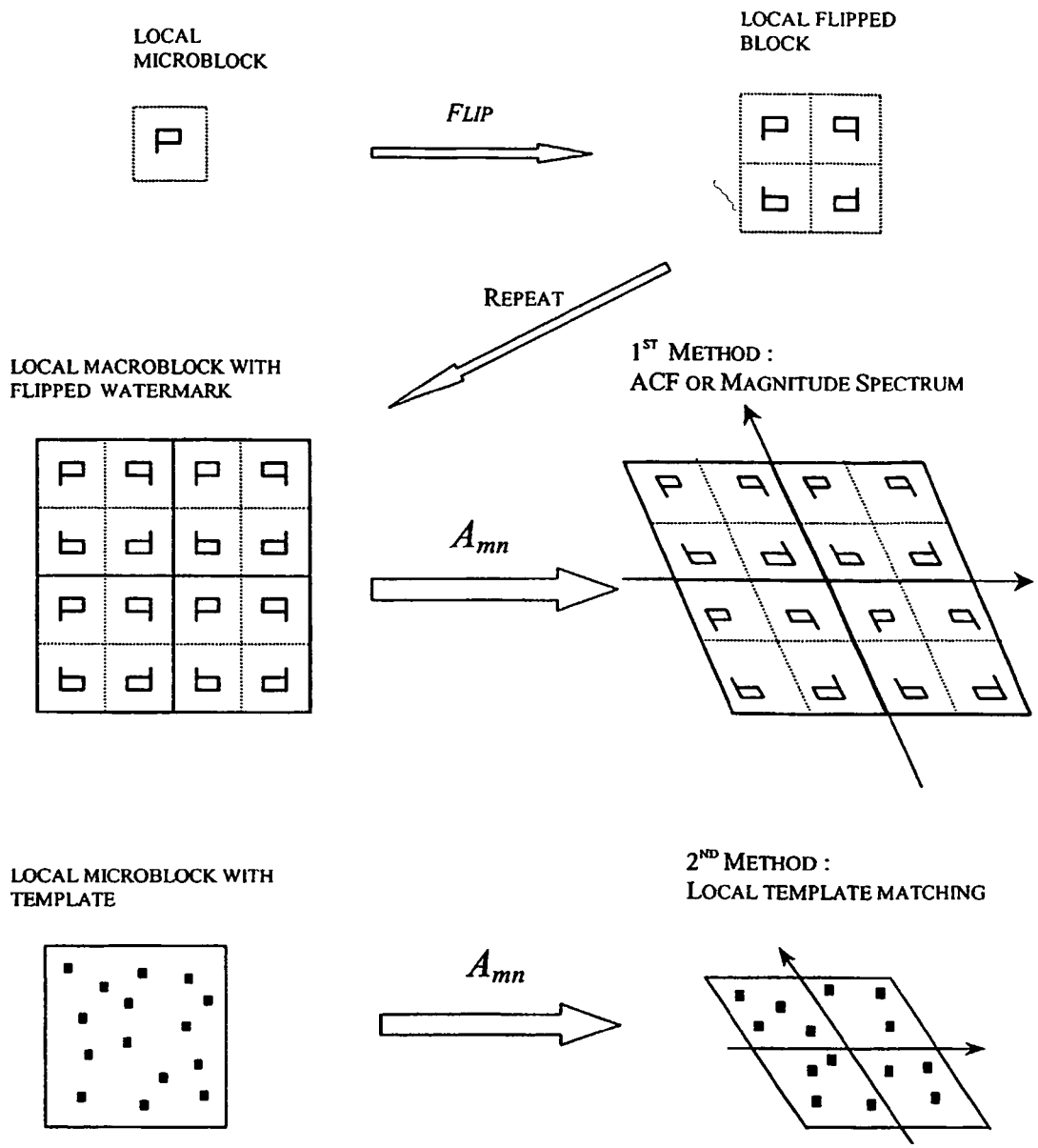
FIG. 3 is a schematic diagram representing a local affine transform.

Referring now to FIG. 3, an estimation of local affine transform is shown, based either on a locally periodic watermark obtained by blocks repetition using local ACF or on the windowed magnitude spectrum, or on template matching at the so called microblock level, which is the smallest complete block before flipping and repetition; in the latter case, the template corresponds to the reference watermark positions.

Secondly, the reference watermark is a key-based sequence that can also be encoded using ECC, and inserted into the image proximate to the informative watermark. This additional reference watermark helps us:

in the determination of the watermark presence or absence in the given image for the given key;

as a pilot for the estimation of a channel state for the optimal design of a matched filter in the decoder for the informative watermark (S. Voloshynovskiy, F. Deguillaume, S. Pereira and T. Pun, "Optimal adaptive diversity watermarking with state channel estimation", Proceedings of SPIE: *Security and Watermarking of Multimedia Content III*, vol. 4314, San Jose, Calif., U.S.A., 22-25 January 2001, the content of which is incorporated herein by reference thereto);

in enhancing the evaluation of the reliability of the local and global geometrical transforms recovering; and in the estimation of the reliability of the decoding of the informative watermark.

Organized in a specific spatial structure, the informative watermark itself can be used for the latter purpose as well. Note that the watermark is not restricted to that of a square shape, but can also be of any regular or irregular shape that is then replicated in a special manner (not necessary strictly periodical) over the image.

Watermark Embedding:

The method described by Voloshynovskiy et al and detailed in the article of S. Voloshynovskiy, F. Deguillaume and T. Pun, "Content adaptive watermarking based on a stochastic multiresolution image modeling", EUSIPCO2000, X European Signal Processing Conference, Tampere, Finland, September 2000, the content of which is incorporated herein by reference thereto, is suitable for this purpose because it offers a good compromise between the block size needed for the watermark embedding, resistance to cropping and includes an assumption about local affine transform approximation of the RBA. Obviously, any block-based technology can be adopted for this purpose. We review the steps involved. We first take the message and encode it using any ECC that performs similarly to those described in the above paper. The codeword is then mapped from $\{0, 1\}$ to $\{-1, 1\}$ and encrypted by multiplying on a key-dependent sequence p with subsequent spreading over a square block or segment of any shape with some density D using a secret key, which we call microblock. The key-dependent reference watermark is first encoded using the same ECC and then is added to the above microblock in the remaining spatial locations. The reference watermark includes a binary key-dependent sequence $\{-1, 1\}$ and its length is determined by the embedding density (1-D) as it is described above. The resulting microblock is up-sampled by a factor 2 to receive a low-pass watermark and then flipped and copied once in each direction, producing a symmetric block, called flipped block. Obviously, non-regular upsampling can be used to produce groups of 2, 3, 4 or more pixels in any spatial arrangement to resist against the printing/scanning attack. Any "center of symmetry" for the flipping, in the general case key-dependent, can be chosen to create the flipped block. Finally, the resulting flipped block can be replicated either over the whole image size, resulting in a symmetrical and periodical watermark at the global level, or only at the local level; local symmetry appears at the flipped block level, while local periodicity can be seen in macroblocks containing at least 4 repeated blocks—2 along each axis—as shown in FIG. 3. In the case of blocks of square shape, the watermark can be expressed as:

$$w_p(x, y) = \sum_{m=0}^{K_x-1} \sum_{n=0}^{K_y-1} w(x - mT, y - nT) \quad (1)$$

where $$K_x = \left\lceil \frac{M}{T} \right\rceil \text{ and } K_y = \left\lceil \frac{N}{T} \right\rceil,$$

and M,N is the image size, T is the period of replication.

The resulting watermark can be slightly pre-distorted in such a way that in every period the watermark can have some small affine distortion to resist against spatial averaging and removal attack based on subtraction of the estimated sign in the blocks or macroblocks. This pre-distortion will not significantly affect the autocorrelation function or magnitude spectrum of the watermark used for the recovering of the global affine transforms and will not interfere with the recovering of local non-linear transforms.

Both the cover image and the watermark are first decomposed into multi-resolution sub-band pyramids using the Wavelet transform and are then added together using a perceptual masking applied to the watermark. A different masking is applied to the flat and textured areas in the image. The resulting stego image is transformed in the coordinate domain or is stored in the compressed domain. The watermark embedding can be also transformed directly in the coordinate domain or in any other transform domain that is used.

Figure 4:
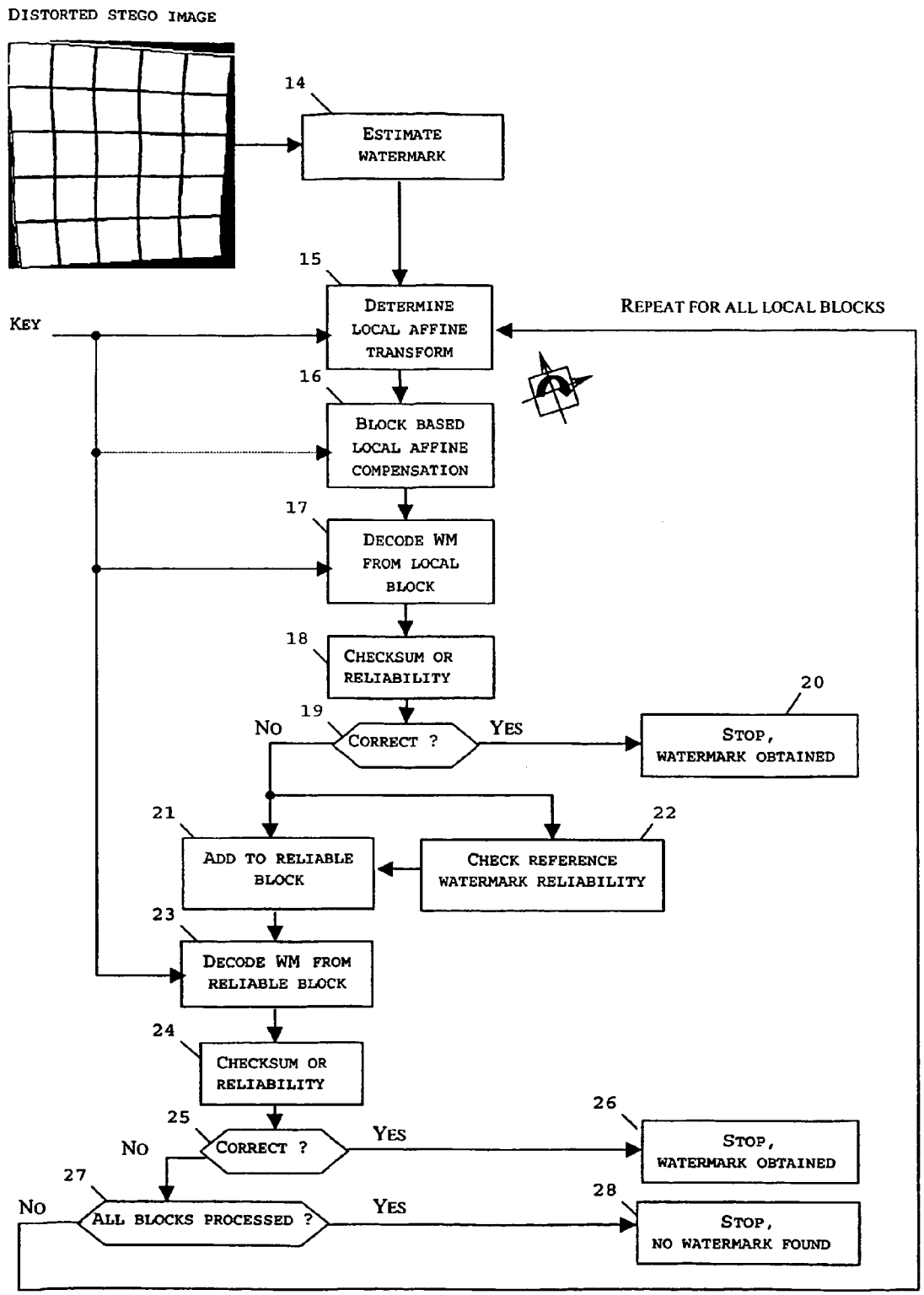
FIG. 4 is a schematic diagram of an adaptive watermark decoder based on the reliability of the reference watermark.

Watermark Extraction and Decoding:

Referring now to FIG. 4, an adaptive watermark decoder is shown, based on the reliability of the reference watermark.

In order to extract the information, we first use either a maximum likelihood estimator, or a penalized likelihood or minimum mean square error estimator. In the case when no geometrical transform has been applied, the message is directly decoded from the extracted watermark. If some geometrical transform was used, the extracted watermark is processed to invert these geometrical transforms. The generalized block diagram of the proposed hierarchical watermark extraction is shown in FIG. 2.

The first stage of the hierarchical approach is to recover the watermark from the watermarked image assuming no geometrical attack. We first check for the presence of the reference watermark in the first block (microblock, flipped block, or macroblock) starting from some reference point (for example the upper left image corner). This is done to have a very fast watermark decoding in the most probable case, where the image was not the subject of attack. If the watermark is successfully decoded, as indicated by the corresponding reliability of the reference watermark decoding or some check sum of the informative watermark, we stop the algorithm and output the corresponding results. If the algorithm cannot reliably recover a watermark from the first block, as might be due to strong lossy JPEG or JEPG2000 compressions, we perform the summation of all blocks with the purpose of integrating, as much as possible, energy to increase the watermark-to-noise ratio and repeat the previous decoding step. The blocks can be taken in any order. This is performed in the sequential blocks 1, 2, and 3 shown in FIG. 2, and block 4 if it was correctly decoded.

If the watermark decoding fails in this case, the assumption is made that some geometrical alterations were applied. Therefore, the second hierarchical level of watermark decoding is activated. In this scenario, we assume first a global affine transform. The recovering from the global affine transform is performed in the blocks 5, 6, and 7, and block 8 if it was successfully decoded (FIG. 2). The recovering from the global affine transform can be accomplished according to a known algorithm described in "Content adaptive watermarking based on a stochastic multiresolution image modeling" (already mentioned). If the decoding is successful, the algorithm is terminated and the decoded watermark is output.

In the opposite case, the third hierarchical level is activated. The decoding of the watermark on this level assumes that, either a random local bending attack, or projective transforms or that local warping might have been applied to the image. These distortions might also have been due to the imaging conditions such as in the case with digital cinema (blocks 9-13 from FIG. 2).

One can use the third hierarchical level directly by omitting the two previous levels in the scenarios when only RBA-type attacks have been applied. This is the case for printing/scanning or digital cinema. This alternate embodiment considerably increases the algorithm time performance.

Recovering from Global Affine Transforms:

An important problem constraining the practical exploitation of watermarking technology involves the fact that existing watermarking algorithms are not robust against general geometrical attacks such as rotation, scaling, cropping, translation, change of aspect ratio and shearing. All these attacks can be uniquely described by a global affine transform. An affine transform can be represented by the 4 coefficients a,b, c,d that form the linear component matrix A, plus a translation component $\bar{v}$:

$$A = \begin{pmatrix} a & b \\ c & d \end{pmatrix} + \vec{v} \qquad (2)$$

The translation component ($\bar{v}$) can be separately recovered, for example based on a cross-correlation between the extracted watermark and the reference watermark mentioned above, or using the zero-phase condition of a symmetrical watermark, and can be ignored in the following developments. Therefore, an affine transform maps each point of Cartesian coordinates (x,y) to (x',y'), according to the formula:

$$\begin{pmatrix} x' \\ y' \end{pmatrix} = A \cdot \begin{pmatrix} x \\ y \end{pmatrix} \qquad (3)$$

where '·' is the matrix product. Successive combination of n affine transforms $A_i$, i=1 ... n yields another affine transform that can be expressed as $A=A_n \cdot A_{n-1} \cdot \ldots \cdot A_1$. With respect to the originally embedded watermark w, the resulting watermark $w'_p$ after a global affine transform can be written as:

$$w'_p(x, y) = \sum_{m=0}^{K_x-1} \sum_{n=0}^{K_y-1} w(A^{-1}(x, y)^T - (mT, nT)^T) \qquad (4)$$

where A is applied to all image blocks. Due to the periodicity of the watermark used, the ACF of the watermark, as well as its magnitude spectrum, this results in a structure showing local maxima, or peaks, which is periodical as well. One can apply this method to estimate the parameters of the affine transform.

Recovering from Local Non-Linear Transforms:

A different situation is observed for the local non-linear transforms. Such transforms locally approximates the RBA, the projective transforms and the local warping as:

$$w'_p(x, y) \approx \sum_{m=0}^{K_x-1} \sum_{n=0}^{K_y-1} w(A_{mn}^{-1}(x, y)^T - (mT, nT)^T) \qquad (5)$$

where $A_{mn}$ is an approximation of the local affine transform applied to the mn th block.

In order to determine local affine transforms, one can either use local ACFs or magnitude spectrums at the macroblock level, or exploit the reference watermark information as template points at the flipped block or microblock level as shown in FIG. 3. Any reasonable estimator can be used to estimate the parameters of the local affine transform based on the correspondence between the reference structure and the modified block.

Thus the method of the invention overcomes the problems associated with local non-linear geometrical distortions such as random bending attack, projective transforms and local warping. The method is based on the approximation of all above attacks by local affine transforms. Two methods have been disclosed which detect the local affine geometrical image modifications based on a locally flipped and periodical watermark, and on a reference watermark. Further, a hierarchical architecture for the decoding of the watermark has been disclosed after a sequence of geometrical attacks. Several alternative embodiments to the basic method are possible, which will now be discussed.

Adaptive Watermarking Decoding:

The method already described can be used for adaptive decoding. Every bit of the encoded message can be considered as having passed through a multichannel communication system in the case of repetitive watermarking or so-called diversity watermarking. While the algorithm which simply performs an addition of the bits from all microblocks to enhance the watermark-to-noise ratio has been described, one may use the information provided by the reference watermark to adaptively select the blocks with the highest reliability with respect to recovery from local geometrical distortions. The method is easily applied since the encoded reference watermark provides the corresponding estimation of decoding reliability.

The block-diagram of the adaptive decoder is shown in FIG. 4. After the watermark has been globally estimated in step 14, the applied local affine transform is estimated for one watermark block in step 15 (a microblock, a flipped block, or a macroblock depending on which form of local template matching or local ACF is used). Then step 16 geometrically compensates the watermark block, and step 17 attempts to decode the watermark. Checksum or reliability of the decoding is estimated in step 18, and if the watermark was correctly decoded in step 19, the whole process is stopped and the watermark returned in step 20. Otherwise, the current watermark block is added to the so called reliable watermark block in step 21 for a more accurate decoding; the reliable block, initialized to zero at the beginning, maintains a weighted average of all encountered watermark blocks which have been considered to be reliable enough during the complete process, according to the previously introduced reliability measure. Therefore the reliability of the current block is checked in step 22, mainly based on the reference watermark, thus helping decide whether or not to add it to the reliable block. Then another decoding attempt is made in step 23 from this reliable block, the reliability of the decoding being checked again in step 24; if decoding was successful in step 25, then the process is stopped and the watermark returned in step 26. Otherwise, if decoding failed at this stage, the sequence from steps 15 to 26 in the diagram is repeated for the next watermark block, and so on until successful decoding or until all the watermark blocks have been processed—in step 27. Finally if, after all the decoding attempts are applied, and yet the watermark still could not be decoded, then, in step 28, the output is simply that a watermark could not be found.

Extensions to Other Data:

While we have described the algorithm for images, it is also directly applicable to video signals or digital cinema watermarking. In the case of video and digital cinema, the algorithm is applied frame by frame or to at least some specific frames in the coordinate or transform domain.

Multiple variations and modifications are possible in the embodiments of the invention described here. Although certain illustrative embodiments of the invention have been shown and described here, a wide range of modifications, changes, and substitutions is contemplated in the foregoing disclosure. In some instances, some features of the present invention may be employed without a corresponding use of the other features. Accordingly, it is appropriate that the foregoing description be construed broadly and understood as being given by way of illustration and example only, the spirit and scope of the invention being limited only by the appended claims.

What is claimed is:

1. A method for generating watermarked data Y based on given original data X, wherein a watermark W associated with the watermarked data Y, comprises a multi-bit informative watermark message and a reference watermark associated with a key, the method comprising the steps of:
 (a) encoding the multi-bit message, and
 (b) generating the watermark W as a function of the key, the encoded message, and the reference watermark,
whereby the reference watermark acts as a reference to assist in the estimation and recovering from local and global alterations of the original data, wherein the reference watermark is used for recovering from local non-linear geometrical alterations using template matching within a single local microblock of the unflipped watermark, or is used locally with the informative watermark for recovering from local non-linear geometrical alterations based on local autocorrelation function, or local windowed magnitude spectrum of a predicted watermark.

2. The method of claim 1, wherein the generated watermarked data Y is visually indistinguishable from the original data X.

3. The method as claimed in claim 1, wherein the multi-bit message and the reference watermark with the associated key are encoded using error correcting codes.

4. The method as claimed in claim 1, wherein the method further estimates channel state.

5. The method as claimed in claim 1, wherein the method further verifies reliability of the decoding.

6. The method as claimed in claim 1, wherein the method further synchronizes decoding of the error correction codes.

7. The method as claimed in claim 1, wherein the encoded reference watermark includes additional bits for checking reliability of associated watermark decoding.

8. The method as claimed in claim 1, wherein the function uses perceptual masking while adding the watermark W to the original data X in the coordinate of a transform domain.

9. The method as claimed in claim 1, wherein the watermark is repeated and locally pre-distorted in every block before combining it with the original data X thereby obtaining generated watermarked data Y that is visually indistinguishable from the original data X.

10. The method as claimed in claim 1, wherein the encoded informative and reference watermarks comprises a regular or irregular structure within the block.

11. The method as claimed in claim 1, wherein the informative and reference watermarks are locally symmetrical with respect to a key-dependent center of symmetry, achieving smaller perceptual impact, basic invariance with respect to 90 degrees rotations and flippings, and cropping and translation resynchronization based on the zero-phase condition of the Fourier transform.

12. The method as claimed in claim 1 wherein the decoded reference watermark is used for estimation of watermark reliability within a block to be added or to be adaptively weighted for combination with the resulting block for enhancement of watermark-to-noise ratio in decoder of error correction codes and to exclude unreliable blocks or to reduce the impact of outliers on the decoding process.

13. The method as claimed in claim 1, wherein the original data X is video data, image data or digital cinema data.

14. The method as claimed in claim 1 applied to video data, wherein a plurality of watermarked video frames is generated.

15. The method as claimed in claim 1, wherein the function operates in spatial domain, Discrete Cosine Transform (DCT) domain, Discrete Fourier Transform (DFT) domain, or Wavelet domain, or another suitable transform domain, or some combination thereof.

16. A computer-readable medium encoded with a program performing a method for generating watermarked data Y based on given original data X, wherein a watermark W associated with the watermarked data Y, comprises a multi-bit informative watermark message and a reference watermark associated with a key, the method comprising the steps of:
 (c) encoding the multi-bit message, and
 (d) generating the watermark W as a function of the key, the encoded message, and the reference watermark,
whereby the reference watermark acts as a reference to assist in the estimation and recovering from local and global alterations of the original data, wherein the reference watermark is used for recovering from local non-linear geometrical alterations using template matching within a single local microblock of the unflipped watermark, or is used locally with the informative watermark for recovering from local non-linear geometrical alterations based on local autocorrelation function, or local windowed magnitude spectrum of a predicted watermark.

* * * * *

UNITED STATES PATENT AND TRADEMARK OFFICE
CERTIFICATE OF CORRECTION

PATENT NO. : 7,664,288 B2  Page 1 of 1
APPLICATION NO. : 10/491681
DATED : February 16, 2010
INVENTOR(S) : Pun et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1029 days.

Signed and Sealed this

Twenty-eighth Day of December, 2010

David J. Kappos
*Director of the United States Patent and Trademark Office*